United States Patent [19]

Oberländer

[11] 4,400,934
[45] Aug. 30, 1983

[54] GAS TURBINE UNIT WITH AUXILIARY DEVICES AND A COMPRESSED AIR BRANCH OR GAS UNDER PRESSURE

[75] Inventor: Georg Oberländer, Bergisch Gladbach, Fed. Rep. of Germany

[73] Assignee: Klöckner-Humboldt-Deutz Aktiengesellschaft, Cologne, Fed. Rep. of Germany

[21] Appl. No.: 184,430

[22] Filed: Sep. 5, 1980

[30] Foreign Application Priority Data

Sep. 6, 1979 [DE] Fed. Rep. of Germany ....... 2936005

[51] Int. Cl.³ .............................................. F02C 7/32
[52] U.S. Cl. .................................... 60/39.07; 60/721
[58] Field of Search ...................... 60/39.07, 650, 682, 60/698, 721

[56] References Cited

U.S. PATENT DOCUMENTS 3,659,417  5/1972  Grieb ................................. 60/39.07
4,182,117  1/1979  Exley et al. ........................ 60/39.07

Primary Examiner—Allen M. Ostrager
Attorney, Agent, or Firm—Becker & Becker, Inc.

[57] ABSTRACT

A gas turbine unit with auxiliary devices and, in the region of the compressor, a compressed air branch or gas under pressure for the operation of the gas turbine. The compressed air branched off from the compressor, or the gas under pressure, serves for direct drive of an energy exchanger which, while avoiding transmissions and the like, generates the oscillating or rotating movement necessary for driving the auxiliary apparatus of the gas turbine unit or the entire system formed therewith. The energy exchanger has working cylinder chambers, and the associated auxiliary apparatus, embodied as pumps, has displacement cylinder chambers, in which chambers pistons embodied in one piece or rigidly connected with each other are arranged axially movable.

11 Claims, 2 Drawing Figures

GAS TURBINE UNIT WITH AUXILIARY DEVICES AND A COMPRESSED AIR BRANCH OR GAS UNDER PRESSURE

The present invention relates to a gas turbine unit with auxiliary devices and, in the region of the compressor, a compressed air branch, or gas under pressure for the operation of the gas turbine.

Gas turbine units are generally known with these features. Units directly required for operation of the gas turbine unit comprise the auxiliary devices, including the fuel feeding or injection pump, the lubricating oil pump, as well as units such as a hydraulic pump for the regulator or control, an auxiliary generator, and the like, depending upon the use or application involved. None of these units, with a conventional embodiment, has an operating speed in the region of the gas turbine speed. For the mechanical drive of the auxiliary devices, therefore, a suitable transmission must be provided which in turn provides a number of branches corresponding to the variously required speed reductions. The gas turbine unit accordingly must be expanded by a costly gearing having a drive which must be taken into consideration already during the construction of the gas turbine. The transmission is concerned with each change of auxiliary devices, and requires high-value structural parts because of the high speed. Compressed air branches in the region of the compressor, with the known gas turbine units, are provided for heating purposes or, in connection with expansion members, for cooling purposes. In an already known simplification of the previously conventional device support, the speed measurement occurs in part by means of an inductive emitter, and starting occurs by subjecting impeller wheels with independently generated compressed air.

It is an object of the present invention to simplify and to reduce the cost of the drive of the auxiliary devices of a gas turbine unit, and to make the same more flexible for changes as to the auxiliary devices. The previous conventional costly apparatus support with speed reduction and branch transmissions is thereby made superfluous. The previously known functions of the compressed air branching are to remain unrestricted. The gas turbine unit under these circumstances is to be capable of being used in stationary installations, for instance as industrial gas turbines, as well as in non-stationary or mobile installations, for instance as a jet drive.

These and other objects and advantages of the present invention will appear more clearly from the following specification in connection with the accompanying drawing, which schematically shows two inventive embodiments of the pressure exchanger, of the gas turbine unit, which follows the compressor; in particular:

Figure 1:
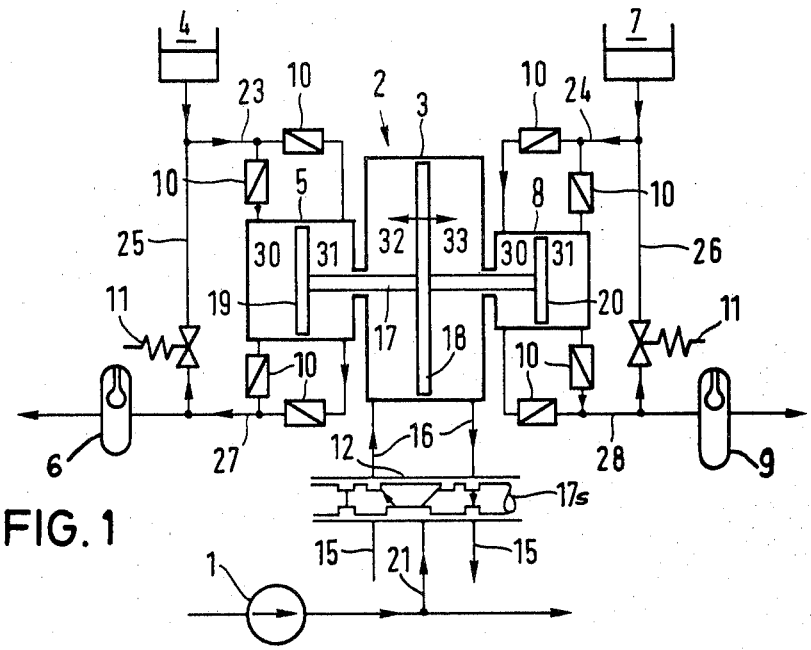
FIG. 1 shows a pressure exchanger and two separate pump units.

The gas turbine unit of the present invention is characterized primarily in that compressed air branched off from the compressor, or gas under pressure, serves for direct drive of an energy exchanger which, while avoiding transmissions and the like otherwise needed for this purpose, generates the oscillating or rotating movement necessary for driving the auxiliary apparatus of the gas turbine unit or the entire configuration formed therewith.

According to the present invention, the energy inherent in the compressed air or in the gas is converted into the necessary movement for driving the auxiliary devices, with conversion occurring in an energy exchanger at a location advantageous for the arrangement of an auxiliary device. The size of the driven energy exchanger can be kept very small with branching-off of highly compressed pressurized or compressed air, or with removal of gas from a high-pressure system. The energy exchanger, depending upon the pressure and quantity conditions of the medium, can be a piston or flow machine. All mechanically driven machines are operable as auxiliary devices, especially also piston or flow machines, whereby in a special case an auxiliary device can generate a pressure medium for driving a further unit. In addition to the simplification of the gas turbine unit by elimination of the apparatus support and the transmission parts, advantageous is the flexibility in relation to the selection and arrangement of the auxiliary devices as gained with the present invention.

The energy is converted to the pressure increase of media in an especially advantageous manner in an energy exchanger with auxiliary devices in the form of piston pumps; these media, for instance pressure oil for lubricating purposes, and fuel, are necessary directly for the operation of the gas turbine unit or machine system formed therewith. A partial flow of the media can serve as working medium for the drive of further auxiliary devices. The transmission is replaced by a structurally considerably simpler apparatus unit which simultaneously takes over the function of the previously necessary fuel and lubricating-oil pumps. Simple hydraulic work machines can be additionally arranged as further auxiliary devices.

An especially advantageous embodiment of an energy exchanger embodied as a unit and having two auxiliary devices provides a double-acting working cylinder unit and two likewise double-acting displacement cylinder units, the three pistons of which are connected with a coaxial piston rod. The individual cylinder cross sections are designed to the pressures or conveying quantities of the conveyed media, i.e., preferably fuel and lubricating oil. Respective working chambers are formed in the cylinder units by the respective pistons with the two stationary cylinder end walls, so that a displacement procedure occurs during piston movement in both directions. A cylinder with a graduated or stepped cross section is used in unison with an energy exchanger embodied with two auxiliary devices in an embodiment simplified in an advantageous manner and in which four cylinder chambers are formed by three pistons connected with a piston rod. This embodiment can be considered as advantageous if only one medium is to be conveyed. In this case, a displacement effect is provided again with piston movement in both directions.

The sealing of the cylinder chambers relative to each other occurs conventionally by means of the pistons gliding in the cylinders. In accordance with the invention, with accurate guidance of the pistons there can also be used engagement-free labyrinth seals. Furthermore, folded bellows can be used which operate free of wear and form cylinder mantles changing in height and simultaneously taking over the guidance of the pistons.

The control of the piston movement can be effected by two coupled 3/2-way valves which in an inventive embodiment are automatically reversed or changed over as magnetic valves by an inductive displacement pickup in the end positions of the pistons.

With gas turbine units which are operated with gas, the pressure generation for the fuel is eliminated. The gas under high pressure can in this case inventively take the place of the compressed air branched off from the compressor and can be utilized for pressure oil conveying.

Referring now to the drawing in detail, FIG. 1 shows a compressed air branch 21 which, after leaving the compressor 1, leads to a 3/2-way valve 12 embodied in a double manner of construction. At a given time, the control slide 17s connects one of the supply lines 16 which leads to the working cylinder 3 on the input side of the pressure transducer with the compressed air branch 21, and connects the other supply line 16 which leads to the working cylinder 3 with one of the venting lines 15. Two changeable or variable working cylinder chambers 32, 33 are formed in the working cylinder 3 by the opposed working surfaces of the power piston 18, which is connected by the piston rod 17 with the driven pistons 19, 20 of the displacement output cylinders 5,8. In the same manner, the pistons 19,20 respectively form two displacement cylinder chambers 30, 31. Suction lines 23, 24 lead from the storage or collecting containers which contain an operating fluid to the displacement cylinder chambers 30, 31 of the displacement cylinders 5,8, from where output or pressure lines 27, 28 lead to the consuming devices over pressure equalizing containers 6,9. Check valves or flaps 10 are arranged in the suction and pressure lines 23, 24, 27, 28. Short-circuit or shunt lines 25, 26, having excess pressure valves 11 and located between the suction lines 23, 24 and the pressure lines 27,28, limit the conveying pressure.

Figure 2:
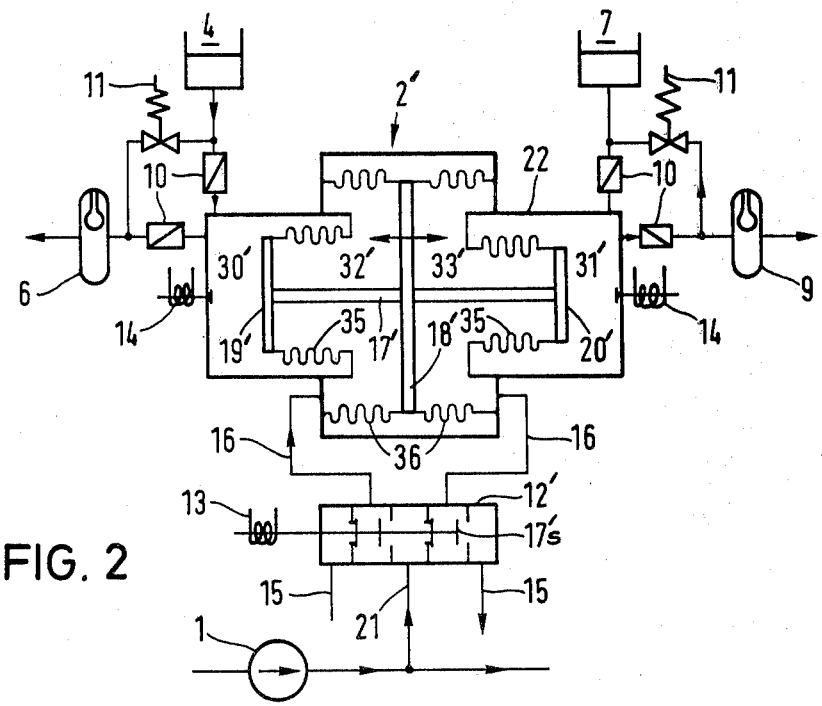
FIG. 2 shows a pressure exchanger with a cylinder having a graduated or stepped cross section and two integrated pump units.

In FIG. 2, the 3/2-way valve 12' has a control slide 17s' with plate seats and a control magnet 13. The pressure or energy exchanger 2' has a cylinder 22 of graduated or stepped cross section, in which the working piston 18', with the displacement pistons 19',20' and the folded bellows 35, 36, forms the changeable or variable working cylinder chambers 32', 33'. Inductive displacement pickups 14 are arranged on the cylinder 22; they deliver a switching pulse when the displacement pistons 19', 20' approach the walls of the cylinder 22. This switching pulse reverses the control magnet 13 of the 3/2-way valve 12. The displacement cylinder chambers 30', 31' are formed with the cylinder 22 by the displacement pistons 19', 20' and the folded bellows 35. The lines and control elements correspond to those illustrated in FIG. 1.

In summary, the present invention provides a gas turbine unit with auxiliary devices and, in the region of the compressor, a compressed air branch, or gas under pressure for the operation of the gas turbine. Compressed air branched off from the compressor 1, or gas under pressure, serves for direct drive of an energy exchanger or pressure transducer 2 which, while avoiding transmissions and the like otherwise needed for this purpose, generates the oscillating or rotating movement necessary for driving the auxiliary devices of the gas turbine unit or the entire system formed therewith.

The energy exchanger or pressure transducer 2 has working cylinder chambers 32, 33, on the input side and the associated auxiliary apparatus, embodied as pumps, has displacement cylinder chambers 30, 31, on the output side in which chambers pistons 18, 19, 20 embodied in one piece or connected rigidly with each other are arranged axially movable, whereby in the working cylinder chambers 32, 33 there is located the compressed air branched off from the compressor 1 or the gas under pressure, and in the displacement cylinder chambers 30, 31 there is located a medium to be conveyed and intended for the gas turbine or for the entire system formed therewith. The input side 32,33 and output side 30,31 are isolated from one another by the walls through which the piston rod 17 passes. The energy exchanger and the associated auxiliary devices, embodied as pumps, are constructed comprising a working cylinder 3 and preferably two displacement cylinders 5,8 in each of which a respective piston 18, 19, 20, which are connected rigidly by a common coaxial piston rod 17, forms two changeable or variable cylinder chambers 30, 31; 32, 33 which are connected at the working cylinder 3 with a pressure line 21 for the compressed air branched off from the compressor 1 and the gas under pressure, and a respective venting line 15; the cylinder chambers at the displacement cylinders 5,8 have a respective suction line 23, 24 and a pressure line 27, 28, and on the suction side are connected to a supply or collecting container of the medium to be conveyed, and on the pressure side are connected by pressure equalization containers 6,9 to lines to the gas turbine and/or to the entire system formed therewith.

The energy exchanger 2 and the associated auxiliary devices, embodied as pumps, are constructed as a unit comprising one cylinder 22, of graduated or stepped cross section, in which three pistons 18', 19', 20' are rigidly connected with each other by a coaxial piston rod 17 to form four changeable or variable cylinder chambers, two of which are working cylinder chambers 32', 33' having volumes changing counter to each other and are respectively connected with a pressure line 21 for the compressed air branched off from the compressor 1 or the gas under pressure, and each have a connection with a venting line 15; and the two other chambers of which are displacement cylinder chambers 30', 31' respectively having a connection to a suction connection 23, 24 and a pressure connection 27,28, and on the suction side are connected to the supply or collecting container of the medium to be conveyed, and on the pressure side are connected by pressure equalization containers 6,9 to lines to the gas turbine and/or to the entire system formed therewith.

The piston rod 17 has axial guides, and the labyrinth seals are arranged on the periphery of the driven pistons 18, 19, and power piston 20 and seal the cylinder chambers 30, 31; 32, 33 relative to each other.

Foldable bellows 35, 36, which are coaxial with respect to the piston rod 17', on the one hand are connected in the vicinity of the periphery to the pistons 18', 19', 20', and on the other hand are connected to the transverse walls of the cylinders, and seal off or isolate the cylinder chambers 30', 31'; 32',33' with respect to each other. A 3/2-way valve 12 embodied in a double or dual manner of construction with a common inlet connection to the pressure line 21 for the compressed air branched off from the compressor 1, or for the gas under pressure, is respectively connected with an outlet connection to a supply line 16 to a working cylinder chamber 22, 23 of the pressure exchanger 2, and is respectively connected with a venting connection to the venting line 15; furthermore, the 3/2-way valve 12, in both positions of its control slide 17s, respectively alternately connects one supply line 16 with the pressure line 21, and the other supply line 16 with a venting line 15.

The 3/2-way valve 12' may be embodied as a magnetic valve, with an inductive displacement or pickup 14 being arranged on the driven piston, 19', and power piston 20' or the piston rod 17' of the pressure exchanger 2' and giving off a control pulse or signal in the end positions of the pistons 18', 19', 20' by way of electrical connection with the control magnet 13 of the 3/2-way valve 12.

The energy exchanger 2 has working chambers, and the associated auxiliary apparatus, embodied as pumps, has displacement chambers, in which chambers rotors, turbines, or pistons embodied in one piece or connected rigidly with each other are rotatably arranged, whereby located in the working chambers is the compressed air branched off from the compressor 1 or the gas under pressure, and located in the displacement chambers is a medium to be conveyed and intended for the gas turbine or for the entire system formed therewith.

The present invention is, of course, in no way restricted to the specific disclosure of the specification and drawing, but also encompasses any modifications within the scope of the appended claims.

What I claim is:

1. In a gas turbine engine which includes a compressor for compressing air for combustion in the engine and auxiliary devices having output functions necessary for the operation of the engine, which auxiliary devices are powered by compressed air bled from the engine, the improvement comprising:
   an air line connected to the compressor for transmitting compressed air therefrom while the compressor is operating;
   at least one source of operating fluid for use by the auxiliary devices;
   a pressure transducer connected to the compressed air line, the pressure transducer including:
      a pressure input side connected to the compressed air line and a pressure output side connected to the source of operating fluid for the auxiliary devices;
      means for isolating the pressure input side from the pressure output side wherein the compressed air on the input side does not mix with the operating fluid on the pressure output side;
      cyclically operated driving means on the input side for pressurizing the pressure output side; the cyclically operated driving means including a power piston reciprocally mounted in a cylinder, the power piston having opposed working surfaces on opposite sides thereof, means for connecting the compressed air line to the cylinder on opposite sides of the power piston, and means for alternately applying the compressed air to the opposed working surfaces of the power piston and for venting the air from the opposed working surfaces of the power piston, whereby the power piston reciprocates to pressurize the operating fluid at the pressure output side.

2. The improvement of claim 1 wherein the pressure transducer is configured as a unit.

3. The improvement of claim 1 wherein the pressure output side includes a pair of driven pistons connected to the power piston and a pair of output cylinders containing the driven pistons, the source of operating fluid being connected to the output cylinders, whereby as the power piston reciprocates, the driven pistons reciprocate in the output cylinders pressurizing the operating fluid.

4. The improvement of claim 3 further including output lines connected to the output cylinders for connecting the output cylinders back to the engine, whereby fluid pressurized in the output cylinders is delivered to the auxiliary devices of the engine.

5. The improvement of claim 4 wherein the auxiliary devices include a lubricating system for the engine and wherein the source of operating fluid contains lubricant.

6. The improvement of claim 4 wherein the auxiliary devices include a fuel delivery system and the source of operating fluid contains fuel.

7. The improvement of claim 5 wherein there is a suction line connecting each source of operating fluid to its respective output cylinder and a one-way valve in the suction line, wherein when the driven piston is moving in a direction to depressurize the output cylinder, the operating fluid is drawn into the cylinder, and when the driven piston is pressurizing the operating fluid, the fluid does not flow back to the source.

8. The improvement of claim 7 wherein there is a one-way valve in each of the output lines and wherein, while the driven pistons are pressurizing the operating fluid, the operating fluid flows out of the output cylinders through the output lines, and when the driven pistons are depressurizing the output fluid, the operating fluid does not return to the output cylinders from the output lines.

9. The improvement of claim 8 further including means for regulating the pressure of the operating fluid in the lines to relieve excess pressure.

10. The improvement of claim 4 wherein the source of operating fluid is connected to the output cylinders on opposite sides of the driven pistons wherein the operating fluid is pressurized continually as the driven piston reciprocates.

11. The improvement of claim 4 wherein the source of operating fluid is connected only to one side of the driven piston whereby the fluid is pressurized only during movement of the piston in one direction, and wherein the means for isolating the pressure input side from the pressure output side include a bellows means connected at least to the driven pistons for preventing the air from entering the output cylinders.

* * * * *